(12) United States Patent
Ramamoorthy et al.

(10) Patent No.: US 11,243,866 B1
(45) Date of Patent: Feb. 8, 2022

(54) METHOD AND SYSTEM FOR CONDUCTING APPLICATION QUALITY TESTS ON COMMUNICATION DEVICES

(71) Applicant: MOZARK PTE. LTD., Singapore (SG)

(72) Inventors: Chandrasekar Ramamoorthy, Mumbai (IN); Sourabh Chowdhury, Mumbai (IN)

(73) Assignee: MOZARK PTE. LTD., Singapore (SG)

( * ) Notice: Subject to any disclaimer, the term of this patent is extended or adjusted under 35 U.S.C. 154(b) by 0 days.

(21) Appl. No.: 17/094,693

(22) Filed: Nov. 10, 2020

(51) Int. Cl.
*G06F 11/36* (2006.01)
*G06N 20/00* (2019.01)
*G06Q 10/06* (2012.01)

(52) U.S. Cl.
CPC ...... *G06F 11/3612* (2013.01); *G06F 11/3688* (2013.01); *G06N 20/00* (2019.01); *G06Q 10/06393* (2013.01)

(58) Field of Classification Search
CPC . G06F 11/3612; G06F 11/3688; G06N 20/00; G06Q 10/06393
See application file for complete search history.

(56) References Cited

U.S. PATENT DOCUMENTS

| | | | | |
|---|---|---|---|---|
| 9,009,677 | B2 * | 4/2015 | Zhao | G06F 11/3688 717/127 |
| 10,073,763 | B1 * | 9/2018 | Raman | G06F 11/3688 |
| 10,216,485 | B2 * | 2/2019 | Misra | G06F 8/60 |
| 10,904,100 | B1 * | 1/2021 | Puttur | H04L 41/0654 |
| 10,917,738 | B2 * | 2/2021 | Hegstad | H04W 4/00 |
| 2010/0083045 | A1 * | 4/2010 | Qiu | H04L 65/80 714/27 |
| 2013/0290512 | A1 * | 10/2013 | Ngoo | H04L 41/0853 709/224 |
| 2014/0075336 | A1 * | 3/2014 | Curtis | G06F 3/0481 715/753 |
| 2016/0044520 | A1 * | 2/2016 | Iyer | H04W 24/08 370/252 |
| 2016/0044523 | A1 * | 2/2016 | Koivisto | H04B 7/024 370/252 |
| 2020/0004667 | A1 * | 1/2020 | Seshadri | G06F 11/36 |
| 2020/0380301 | A1 * | 12/2020 | Siracusa | G06F 8/34 |

* cited by examiner

*Primary Examiner* — Douglas M Slachta
(74) *Attorney, Agent, or Firm* — Kolisch Hartwell, P.C.

(57) ABSTRACT

The present disclosure provides a method and system for conducting application quality tests on communication devices using an application quality testing system. The application quality testing system initiates a plurality of tests on one or more communication devices for measuring an application experience. In addition, the application quality testing system receives an active testing data and a passive testing data. Further, the application quality testing system integrates the active testing data and the passive testing data associated with the one or more communication devices. Furthermore, the application quality testing system analyzes the active testing data and the passive testing data using one or more machine learning algorithms. Moreover, the application quality testing system evaluates the application experience of each of one or more applications. Also, the application quality testing system performs a device clean-up and maintenance for the one or more communication devices.

20 Claims, 5 Drawing Sheets

METHOD AND SYSTEM FOR CONDUCTING APPLICATION QUALITY TESTS ON COMMUNICATION DEVICES

TECHNICAL FIELD

The present invention relates to the technical field of quality inspection system, and in particular, relates to a method and system for conducting application quality tests on communication devices.

INTRODUCTION

Over the past few years, applications have become a popular way for end users to perform various activities. The applications include documentation applications, data management applications, financial applications, entertainment applications, educational applications, enterprise applications, simulation applications, media development applications, and the like. In addition, developer of each of the applications require to conduct quality inspection to analyze user experience on respective application. Further, the user experience is dependent on a plurality of factors. The plurality of factors includes networks, content delivery, design, user interface, latency, packet loss, signal strength, and the like. Furthermore, the developer of each of the applications require to analyze the user experience to take corrective measures to improve the user experience. Moreover, the developer of each of the applications requires automatic application experience inspecting tool to control communication devices of the end users. Also, the developer of each of the applications loses the end users due to bad user experience. Also, the developer of each of the applications loses revenue due to bad user experience.

SUMMARY

In a first example, a computer-implemented method is provided. The computer-implemented method to conduct application quality tests on communication devices. The computer-implemented method includes a first step to initiate a plurality of tests on one or more communication devices to measure an application experience in real time. In addition, the computer-implemented method includes a second step to receive an active testing data and a passive testing data associated with the one or more communication devices in real time. Further, the computer-implemented method includes a third step to integrate the active testing data and the passive testing data associated with the one or more communication devices in real time. Furthermore, the computer-implemented method includes a fourth step to analyze the active testing data and the passive testing data using one or more machine learning algorithms. The analysis is performed based on training of a machine learning model. The analysis is performed in real time. Moreover, the computer-implemented method includes a fifth step to evaluate the application experience of each of one or more applications of the one or more communication devices using the one or more machine learning algorithms. Also, the computer-implemented method includes a sixth step to perform a device clean-up and maintenance for the one or more communication devices on detection of a plurality of issues in real time.

In an embodiment of the present disclosure, the computer-implemented method detects the plurality of issues associated with the one or more communication devices in real time.

In an embodiment of the present disclosure, the one or more communication devices are present in a plurality of geographical locations with any of a network condition of a communication network. In addition, the network condition of the communication network governs the application experience of each of the one or more applications. Further, the network condition of the communication network includes poor, moderate, good, and excellent.

In an embodiment of the present disclosure, the computer-implemented method identifies a plurality of key performance indicators for each of the one or more applications. In addition, the plurality of key performance indicators includes a technical application data and an application business data. Further, the technical application data corresponds to data associated with performance of each of the one or more applications. Furthermore, the application business data includes application churn rate and drop in engagement. Moreover, the technical application data is dependent on one or more features. Also, the one or more features include load speed, the one or more communication devices, operating system, and crash reports. Also, the application business data depends on a plurality of aspects. Also, the plurality of aspects includes session length, average application visits, daily active users, application churn rate, retention rate, and revenue.

In an embodiment of the present disclosure, the computer-implemented method calculates an application quality index based on the analysis of the active testing data and the passive testing data using the one or more machine learning algorithms.

In an embodiment of the present disclosure, the computer-implemented method schedules the plurality of tests for the one or more communication devices based on the analysis using the one or more machine learning algorithms.

In an embodiment of the present disclosure, the computer-implemented method prevents application crashes of the one or more applications due to constant polling of a range of user interface events in real time.

In an embodiment of the present disclosure, the computer-implemented method enables a plurality of developers of the one or more applications to analyze the application experience. In addition, the application experience depends on a plurality of factors. Further, the plurality of factors includes signal strength, quality, transmission power, handover latency, Inter Radio Access Technologies, downlink throughput, and uplink throughput. Furthermore, the plurality of factors includes latency, packet loss, jitter, web latency of websites, and video latency from user end.

In an embodiment of the present disclosure, the computer-implemented method assigns a unique test run identity prior to executing the plurality of tests automatically on the one or more applications. In addition, the unique test run identity is unique for each of the plurality of tests run on the one or more communication devices.

In an embodiment of the present disclosure, the computer-implemented method computes the network condition of the communication network of corresponding user of a plurality of users prevailing during the plurality of tests.

In a second example, a computer system is provided. The computer system includes one or more processors, a signal generator circuitry embedded inside a computing device for generating a signal, and a memory. The memory is coupled to the one or more processors. The memory stores instructions. The instructions are executed by the one or more processors. The execution of the instructions causes the one or more processors to perform a method to conduct the application quality tests on the communication devices using the application quality testing system. The method includes a first step to initiate the plurality of tests on the one or more communication devices to measure the application experience in real time. In addition, the method includes a second step to receive the active testing data and the passive testing data associated with the one or more communication devices in real time. Further, the method includes a third step to integrate the active testing data and the passive testing data associated with the one or more communication devices in real time. Furthermore, the method includes a fourth step to analyze the active testing data and the passive testing data using the one or more machine learning algorithms. The analysis is performed based on training of the machine learning model. The analysis is performed in real time. Moreover, the method includes a fifth step to evaluate the application experience of each of the one or more applications of the one or more communication devices using the one or more machine learning algorithms. Also, the method includes a sixth step to perform the device clean-up and the maintenance for the one or more communication devices on detection of the plurality of issues in real time.

In an embodiment of the present disclosure, the application quality testing system detects the plurality of issues associated with the one or more communication devices in real time.

In an embodiment of the present disclosure, the one or more communication devices are present in the plurality of geographical locations with any of the network condition of the communication network. In addition, the network condition of the communication network governs the application experience of each of the one or more applications. Further, the network condition of the communication network includes poor, moderate, good, and excellent.

In an embodiment of the present disclosure, the application quality testing system identifies the plurality of key performance indicators for each of the one or more applications. In addition, the plurality of key performance indicators includes the technical application data and the application business data. Further, the technical application data corresponds to data associated with performance of each of the one or more applications. Furthermore, the application business data includes application churn rate and drop in engagement. Moreover, the technical application data is dependent on the one or more features. Also, the one or more features include load speed, the one or more communication devices, operating system, and crash reports. Also, the application business data depends on the plurality of aspects. Also, the plurality of aspects includes session length, average application visits, daily active users, application churn rate, retention rate, and revenue.

In an embodiment of the present disclosure, the application quality testing system calculates the application quality index based on the analysis of the active testing data and the passive testing data using the one or more machine learning algorithms.

In an embodiment of the present disclosure, the application quality testing system schedules the plurality of tests for the one or more communication devices based on the analysis using the one or more machine learning algorithms.

In an embodiment of the present disclosure, the application quality testing system prevents the application crashes of the one or more applications due to constant polling of the range of user interface events in real time.

In an embodiment of the present disclosure, the application quality testing system enables the plurality of developers of the one or more applications to analyze the application experience. In addition, the application experience depends on the plurality of factors. Further, the plurality of factors includes signal strength, quality, transmission power, handover latency, Inter Radio Access Technologies, downlink throughput, and uplink throughput. Furthermore, the plurality of factors includes latency, packet loss, jitter, web latency of websites, and video latency from user end.

In an embodiment of the present disclosure, the application quality testing system assigns the unique test run identity prior to executing the plurality of tests automatically on the one or more applications. In addition, the unique test run identity is unique for each of the plurality of tests run on the one or more communication devices.

In an embodiment of the present disclosure, the application quality testing system computes the network condition of the communication network of corresponding user of the plurality of users prevailing during the plurality of tests.

In a third example, a non-transitory computer-readable storage medium is provided. The non-transitory computer-readable storage medium encodes computer executable instructions that, when executed by at least one processor, performs a method to conduct the application quality tests on the communication devices. The method includes a first step to initiate the plurality of tests on the one or more communication devices to measure the application experience in real time. In addition, the method includes a second step to receive the active testing data and the passive testing data associated with the one or more communication devices in real time. Further, the method includes a third step to integrate the active testing data and the passive testing data associated with the one or more communication devices in real time. Furthermore, the method includes a fourth step to analyze the active testing data and the passive testing data using the one or more machine learning algorithms. The analysis is performed based on training of the machine learning model. The analysis is performed in real time. Moreover, the method includes a fifth step to evaluate the application experience of each of the one or more applications of the one or more communication devices using the one or more machine learning algorithms. Also, the method includes a sixth step to perform the device clean-up and the maintenance for the one or more communication devices on detection of the plurality of issues in real time.

BRIEF DESCRIPTION OF THE DRAWINGS

Figure 1:
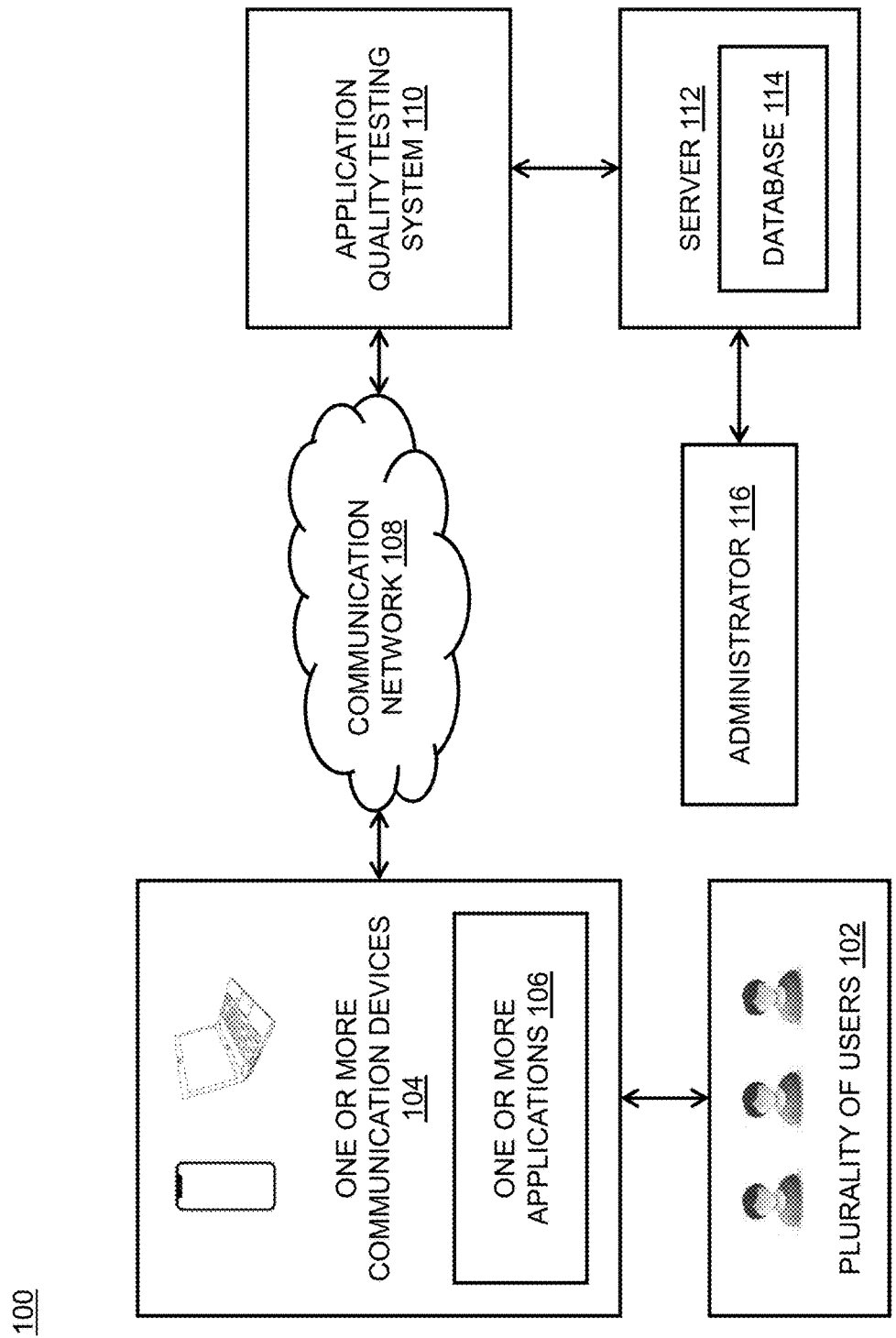
Figure 2:
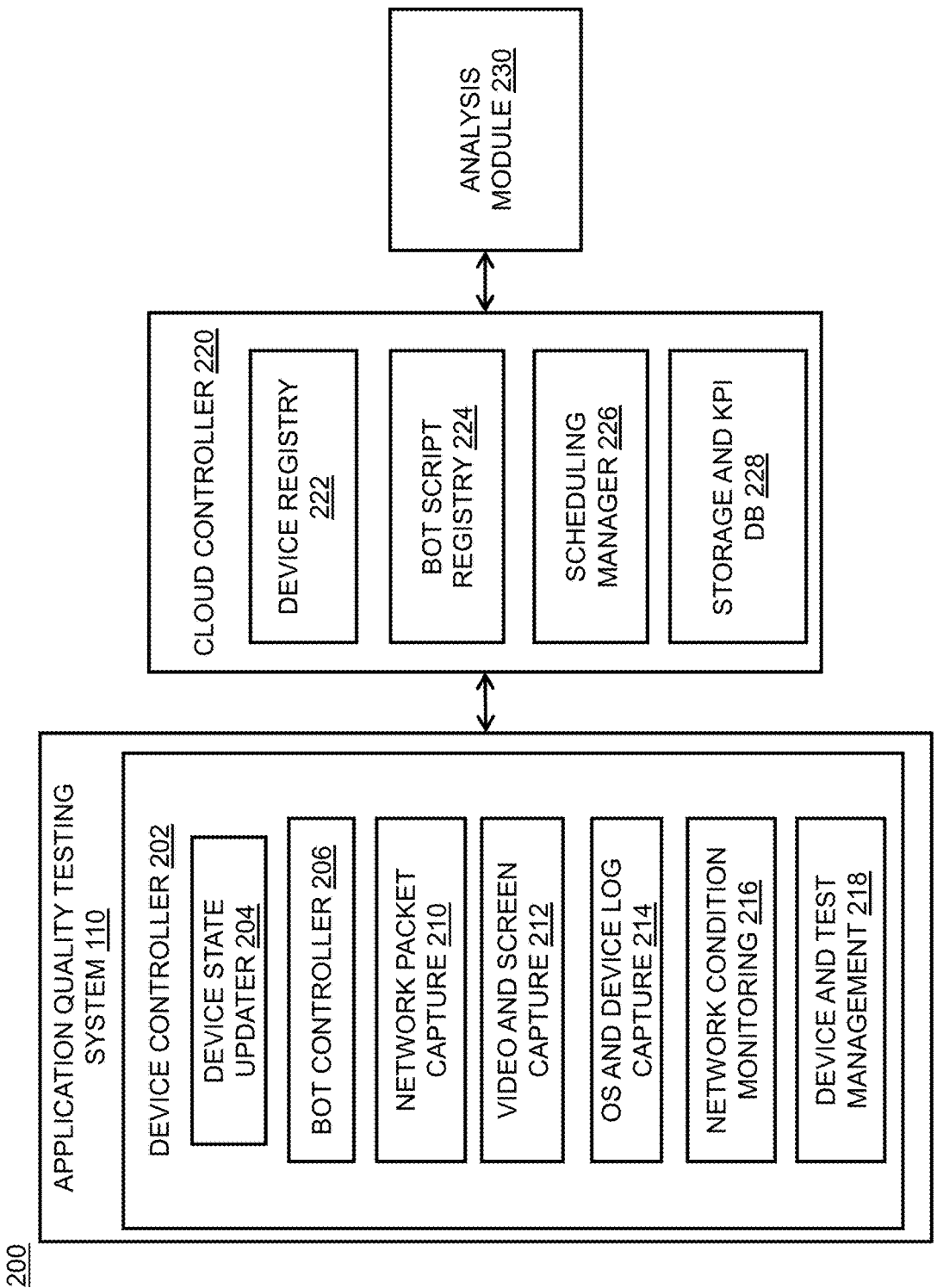
Figure 3A:
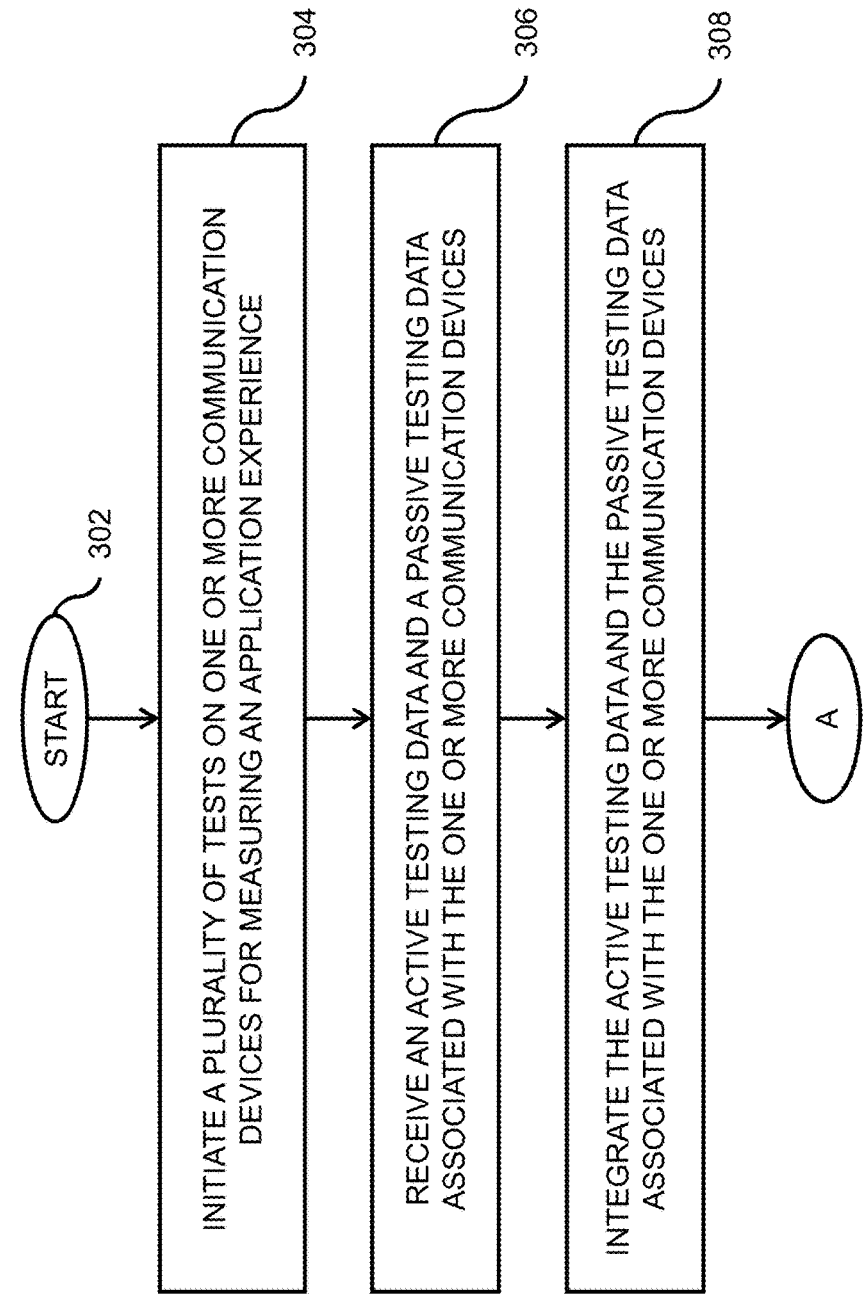
Figure 3B:
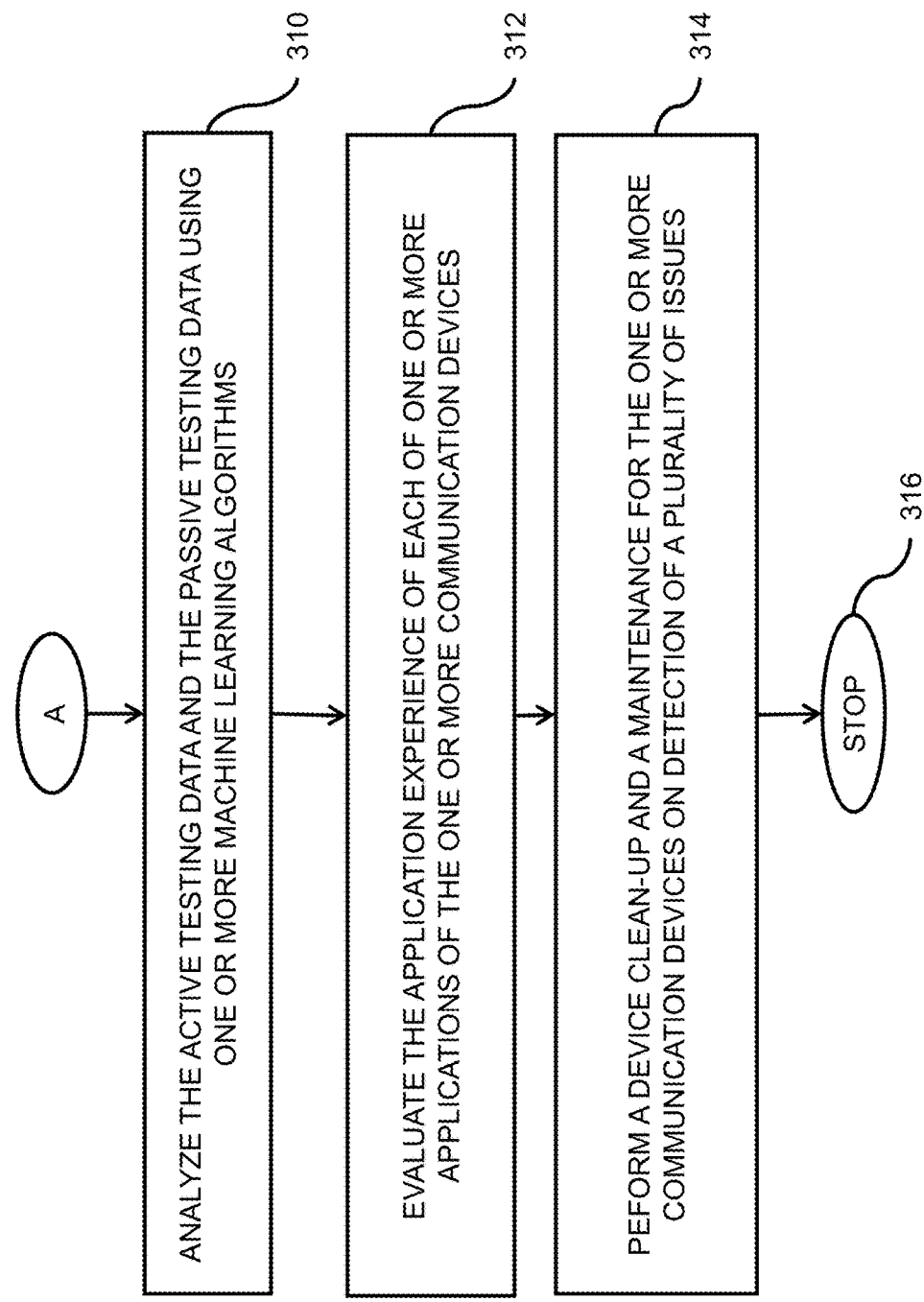
Figure 4:
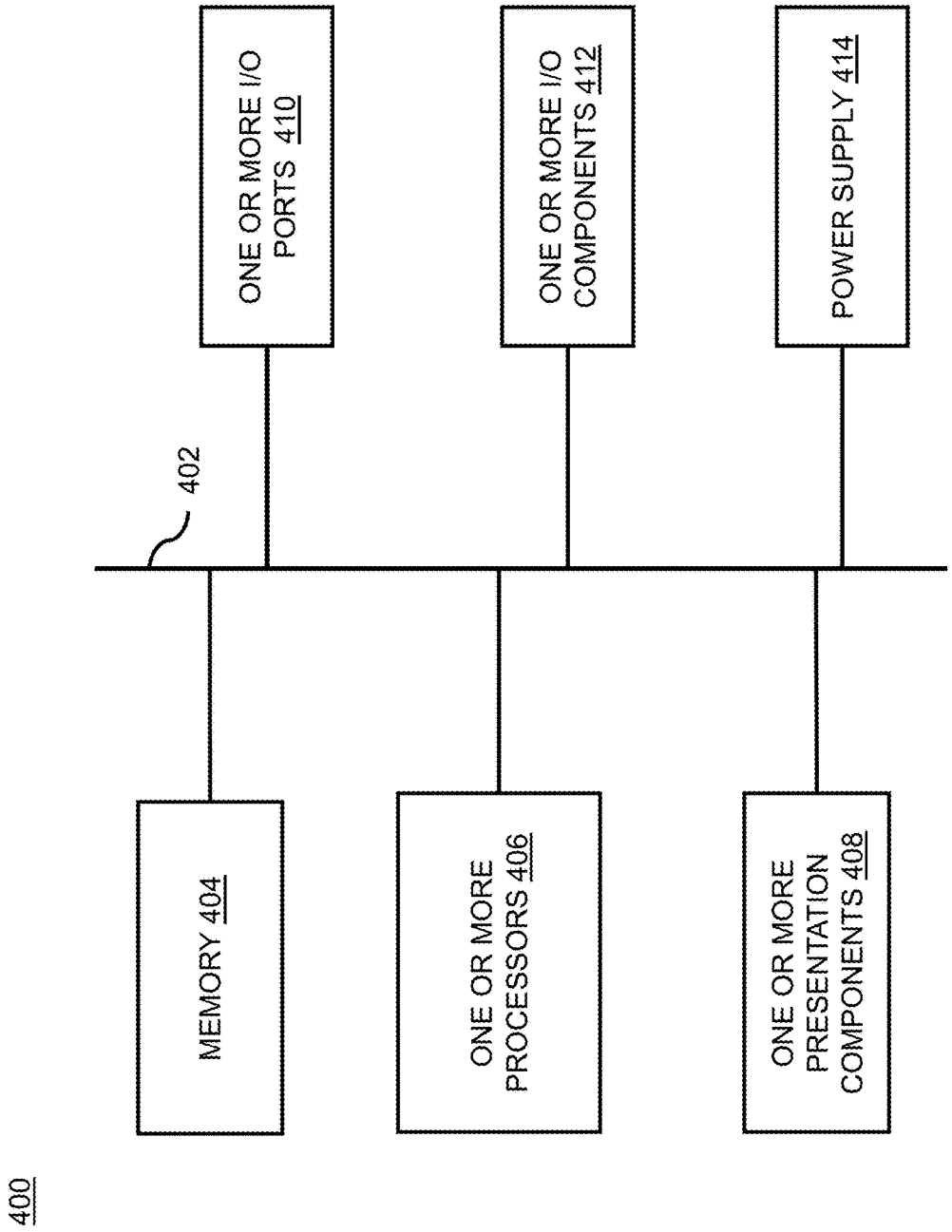

Having thus described the invention in general terms, reference will now be made to the accompanying drawings, which are not necessarily drawn to scale, and wherein:

FIG. 1 illustrates an interactive computing environment for conducting application quality tests on one or more communication devices in real time, in accordance with various embodiments of the present disclosure;

FIG. 2 illustrates a functional architecture of an application quality testing system associated with a cloud controller, in accordance with various embodiments of the present disclosure;

FIGS. 3A and 3B illustrate a flowchart of a method for conducting the application quality tests on the one or more communication devices in real time, in accordance with various embodiments of the present disclosure; and FIG. 4 illustrates a block diagram of a computing device, in accordance with various embodiments of the present disclosure.

There may be additional structures described in the description that are not depicted in the drawings, and the absence of such depictions should not be considered as an omission of such design from the specification.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates an interactive computing environment 100 for conducting application quality tests on one or more communication devices 104 in real time, in accordance with various embodiments of the present disclosure. FIG. 2 illustrates a functional architecture 200 of an application quality testing system 110 associated with a cloud controller 220, in accordance with various embodiments of the present disclosure. The interactive computing environment 100 includes a plurality of users 102, the one or more communication devices 104, one or more applications 106, and a communication network 108. In addition, the interactive computing environment 100 includes the application quality testing system 110, a server 112, a database 114 and an administrator 116. The interactive computing environment 100 is any environment facilitating interaction of the plurality of users 102 with the one or more applications 106. The above stated elements of the interactive computing environment 100 operate coherently and synchronously to conduct the application quality tests on the one or more communication devices 104.

The interactive computing environment 100 includes the plurality of users 102. In addition, the plurality of users 102 may be any person or individual accessing the one or more communication devices 104. In an embodiment of the present disclosure, the plurality of users 102 is an owner of the one or more communication devices 104. In another embodiment of the present disclosure, the plurality of users 102 is not the owner of the one or more communication devices 104. In an embodiment of the present disclosure, the plurality of users 102 accesses the one or more communication devices 104 at home. In another embodiment of the present disclosure, the plurality of users 102 accesses the one or more communication devices 104 at a cafe. In yet another embodiment of the present disclosure, the plurality of users 102 accesses the one or more communication devices 104 in an office. In an example, a user U1 accesses a smartphone S1 while sitting in a living room. In another example, a user U2 accesses a laptop L1 while travelling from one place to another. In yet another example, a user U3 accesses a desktop computer D1 while working in the office.

The interactive computing environment 100 includes the plurality of users 102. The plurality of users 102 corresponds to any number of person or individual associated with the application quality testing system 110. The application quality testing system 110 accesses an application experience of each of the plurality of users 102 on the one or more applications 106 of the one or more communication devices 104. In an example, a user U1 watches action movie on an application A1 through a communication device D1 (let's say a smartphone). In another example, a user U2 performs financial transaction on an application A2 through a communication device D2 (let's say a desktop computer). In yet another example, a user U3 performs documentation on an application A3 through a communication device D3 (let's say a laptop). The plurality of users 102 accesses the one or more applications 106 on the one or more communication devices 104. In addition, the one or more communication devices 104 are associated with the plurality of users 102.

The interactive computing environment 100 includes the plurality of users 102 who is any person present at any of a plurality of geographical locations and accessing the one or more applications 106. The plurality of users 102 is any legal person or natural person who access the one or more applications 106 and need an IP based network for accessing the one or more applications 106. In addition, the plurality of users 102 is an individual or person who accesses the one or more applications 106 on the one or more communication devices 104.

The interactive computing environment 100 includes the one or more communication devices 104 that enable the plurality of users 102 to access the one or more applications 106. The one or more communication devices 104 are internet-enabled device to allow the plurality of users 102 to access the one or more applications 106.

In addition, the one or more communication devices 104 facilitate access to the one or more applications 106. In an embodiment of the present disclosure, each of the one or more communication devices 104 is a portable communication device. The portable communication device includes but may not be limited to a laptop, a smartphone, a tablet, and a smart watch. In an example, the smartphone may be an iOS-based smartphone, an android-based smartphone, a windows-based smartphone and the like. In another embodiment of the present disclosure, each of the one or more communication devices 104 is a fixed communication device. The fixed communication device includes but may not be limited to a desktop, a workstation, a smart TV and a mainframe computer. In an embodiment of the present disclosure, the one or more communication devices 104 are currently in the switched-on state. The one or more communication devices 104 are any type of devices having an active internet. In addition, each of the plurality of users 102 accesses corresponding communication device of the one or more communication devices 104 in real-time.

In an embodiment of the present disclosure, the one or more communication devices 104 perform computing operations based on a suitable operating system installed inside the one or more communication devices 104. In general, the operating system is system software that manages computer hardware and software resources and provides common services for computer programs. In addition, the operating system acts as an interface for software installed inside the one or more communication devices 104 to interact with hardware components of the one or more communication devices 104. In an embodiment of the present disclosure, each of the one or more communication devices 104 perform computing operations based on any suitable operating system designed for the portable communication device. In an example, the operating system installed inside the one or more communication devices 104 is a mobile operating system. Further, the mobile operating system includes but may not be limited to windows operating system, android operating system, iOS operating system, and Sailfish. However, the operating system is not limited to above mentioned operating systems. In an embodiment of the present disclosure, the one or more communication devices 104 operate on any version of particular operating system corresponding to above mentioned operating systems.

In another embodiment of the present disclosure, the one or more communication devices 104 perform computing operations based on any suitable operating system designed for fixed communication device. In an example, the operating system installed inside the one or more communication devices 104 is windows. In another example, the operating system installed inside the one or more communication devices 104 is Mac. In yet another example, the operating system installed inside the one or more communication devices 104 is Linux based operating system. In yet another example, the operating system installed inside the one or more communication devices 104 is Chrome OS. In yet another example, the operating system installed inside the one or more communication devices 104 may be one of UNIX, *Kali* Linux, and the like. However, the operating system is not limited to above mentioned operating systems.

In an embodiment of the present disclosure, the one or more communication devices 104 operate on any version of windows operating system. In another embodiment of the present disclosure, the one or more communication devices 104 operate on any version of Mac operating system. In yet another embodiment of the present disclosure, the one or more communication devices 104 operate on any version of Linux operating system. In yet another embodiment of the present disclosure, the one or more communication devices 104 operate on any version of Chrome OS. In yet another embodiment of the present disclosure, the one or more communication devices 104 operate on any version of particular operating system corresponding to above mentioned operating systems.

The one or more communication devices 104 enable the plurality of users 102 to access the one or more applications 106. The one or more communication devices 104 are internet-enabled devices that allow the plurality of users 102 to access the one or more applications 108. In an embodiment of the present disclosure, the one or more applications 106 are installed on the one or more communication devices 104. The one or more applications 106 allow the plurality of users 102 to perform a plurality of activities. In another embodiment of the present disclosure, the one or more applications 106 are run on a plurality of web browsers installed on the one or more communication devices 104. In an example, the plurality of web browsers include but may not be limited to Opera, Mozilla Firefox, Google Chrome, Internet Explorer, Microsoft Edge, Safari and UC Browser. Further, the plurality of web browsers installed on the one or more communication devices 104 runs on any version of the respective web browser of the above mentioned web browsers. In an embodiment of the present disclosure, the plurality of users 102 installs the one or more applications 106 on the one or more communication devices 104. In another embodiment of the present disclosure, the plurality of users 102 accesses the one or more applications 106 on the plurality of web browsers installed on the one or more communication devices 104.

In an example, a user U1 connects with the interactive computing environment 100 through a communication device D1 (let's say a smartphone) to run an application A1. In another example, a user U2 connects with the interactive computing environment 100 through a communication device D2 (let's say a desktop computer) at home to perform activities on an application A2. The user U3 connects with the interactive computing environment 100 with a communication device D3 (let's say a tablet) while travelling to access an application A3.

Each of the one or more communication devices 104 comprises of a memory. In general, the memory includes computer-storage media in the form of volatile and/or non-volatile memory. The memory may be removable, non-removable, or a combination thereof. Exemplary hardware devices include solid-state memory, hard drives, optical-disc drives, etc. The memory is coupled with one or more processors. In general, the one or more processor read data from various entities such as memory or I/O components. The one or more processors execute the one or more instructions which are stored in the memory. The one or more processors provide execution method for one or more instructions provided by the application quality testing system 110.

The one or more communication devices 104 are a media device. The one or more communication devices 104 enable the plurality of users 102 to perform the plurality of activities on the one or more applications 106. The one or more communication devices 104 support various multimedia contents. The plurality of users 102 performs the plurality of activities in real-time through the one or more communication devices 104.

The interactive computing environment 100 includes the one or more applications 106. The one or more applications 106 correspond to program designed for the plurality of users 102 to perform the plurality of activities. The plurality of activities includes streaming, calendaring, scheduling, banking, trading, blogging, mailing, accounting, editing, designing, database management, word processing, simulation, and the like. The plurality of users 102 performs the plurality of activities on the one or more applications 106 through the one or more communication devices 104. In an example, a user U1 watches comedy show C1 on application A1 through a communication device D1 (let's say a smartphone). In another example, a user U2 explores smart watches on application A2 through a communication device D2 (let's say a desktop computer) in real-time. In yet another example, a user U3 reads fiction novel N1 on application A3 through a communication device D3 (let's say a laptop) in real-time.

In an embodiment of the present disclosure, the one or more applications 106 include documentation applications, data management applications, financial applications, and entertainment applications. In another embodiment of the present disclosure, the one or more applications 106 include educational applications, enterprise applications, simulation applications, media development applications, and the like. In addition, the one or more applications 106 are developed by a plurality of developers. Further, the plurality of developers requires an automated application inspection tool to analyze the application experience of the plurality of users 102 on the one or more applications 106. Furthermore, the application experience depends on a plurality of factors. Moreover, the plurality of factors includes signal strength, quality, transmission power, handover latency, Inter Radio Access Technologies, downlink throughput, uplink throughput, latency, and packet loss. Also, the plurality of factors includes jitter, web latency of websites, video latency from user end, and the like.

The interactive computing environment 100 includes the communication network 108. The one or more communication devices 104 are connected to the communication network 108. The communication network 108 provides a medium for the plurality of users 102 accessing the one or more applications 106 to connect with the application quality testing system 110. In an embodiment of the present disclosure, the communication network 108 is an internet connection. In another embodiment of the present disclosure, the communication network 108 is a wireless mobile network. In yet another embodiment of the present disclosure, the communication network 108 is a wired network with a finite bandwidth. In yet another embodiment of the present disclosure, the communication network 108 is a combination of the wireless and the wired network for the optimum throughput of data transmission. In yet another embodiment of the present disclosure, the communication network 108 is an optical fiber high bandwidth network that enables a high data rate with negligible connection drops. The communication network 108 includes a set of channels. Each channel of the set of channels supports a finite bandwidth. Moreover, the finite bandwidth of each channel of the set of channels is based on capacity of the communication network 108. The communication network 108 connects the one or more communication devices 104 to the application quality testing system 110 using a plurality of methods. The plurality of methods used to provide network connectivity to the one or more communication devices 104 includes 2G, 3G, 4G, 5G, Wifi and the like.

The interactive computing environment 100 includes the application quality testing system 110. The application quality testing system 110 conducts a plurality of tests on the one or more communication devices 104 to measure the application experience in real time. In addition, the one or more communication devices 104 are present in the plurality of geographical locations with any of a network condition of the communication network 108. Further, the network condition of the communication network 108 governs the application experience of each of the one or more applications 106. Furthermore, the network condition of the communication network 108 includes but may not be limited to poor, moderate, good, and excellent. Moreover, the network condition of the communication network 108 impacts the application experience of each of the one or more applications 106.

In an embodiment of the present disclosure, the plurality of tests is initiated for the documentation applications installed on the portable communication device according to the network condition of the internet connection. In another embodiment of the present disclosure, the plurality of tests is initiated for the documentation applications installed on the portable communication device according to the network condition of the wireless mobile network. In yet another embodiment of the present disclosure, the plurality of tests is initiated for the documentation applications installed on the portable communication device according to the network condition of the wired network with the finite bandwidth. In yet another embodiment of the present disclosure, the plurality of tests is initiated for the documentation applications installed on the portable communication device according to the network condition of the optical fiber high bandwidth network.

In an embodiment of the present disclosure, the plurality of tests is initiated for the documentation applications installed on the fixed communication device according to the network condition of the internet connection. In another embodiment of the present disclosure, the plurality of tests is initiated for the documentation applications installed on the fixed communication device according to the network condition of the wireless mobile network. In yet another embodiment of the present disclosure, the plurality of tests is initiated for the documentation applications installed on the fixed communication device according to the network condition of the wired network with the finite bandwidth. In yet another embodiment of the present disclosure, the plurality of tests is initiated for the documentation applications installed on the fixed communication device according to the network condition of the optical fiber high bandwidth network.

In an embodiment of the present disclosure, the plurality of tests is initiated for the data management applications installed on the portable communication device according to the network condition of the internet connection. In another embodiment of the present disclosure, the plurality of tests is initiated for the data management applications installed on the portable communication device according to the network condition of the wireless mobile network. In yet another embodiment of the present disclosure, the plurality of tests is initiated for the data management applications installed on the portable communication device according to the network condition of the wired network with the finite bandwidth. In yet another embodiment of the present disclosure, the plurality of tests is initiated for the data management applications installed on the portable communication device according to the network condition of the optical fiber high bandwidth network.

In an embodiment of the present disclosure, the plurality of tests is initiated for the data management applications installed on the fixed communication device according to the network condition of the internet connection. In another embodiment of the present disclosure, the plurality of tests is initiated for the data management applications installed on the fixed communication device according to the network condition of the wireless mobile network. In yet another embodiment of the present disclosure, the plurality of tests is initiated for the data management applications installed on the fixed communication device according to the network condition of the wired network with the finite bandwidth. In yet another embodiment of the present disclosure, the plurality of tests is initiated for the data management applications installed on the fixed communication device according to the network condition of the optical fiber high bandwidth network.

In an embodiment of the present disclosure, the plurality of tests is initiated for the financial applications installed on the portable communication device according to the network condition of the internet connection. In another embodiment of the present disclosure, the plurality of tests is initiated for the financial applications installed on the portable communication device according to the network condition of the wireless mobile network. In yet another embodiment of the present disclosure, the plurality of tests is initiated for the financial applications installed on the portable communication device according to the network condition of the wired network with the finite bandwidth. In yet another embodiment of the present disclosure, the plurality of tests is initiated for the financial applications installed on the portable communication device according to the network condition of the optical fiber high bandwidth network.

In an embodiment of the present disclosure, the plurality of tests is initiated for the financial applications installed on the fixed communication device according to the network condition of the internet connection. In another embodiment of the present disclosure, the plurality of tests is initiated for the financial applications installed on the fixed communication device according to the network condition of the wireless mobile network. In yet another embodiment of the present disclosure, the plurality of tests is initiated for the financial applications installed on the fixed communication device according to the network condition of the wired network with the finite bandwidth. In yet another embodiment of the present disclosure, the plurality of tests is initiated for the financial applications installed on the fixed communication device according to the network condition of the optical fiber high bandwidth network.

In an embodiment of the present disclosure, the plurality of tests is initiated for the entertainment applications installed on the portable communication device according to the network condition of the internet connection. In another embodiment of the present disclosure, the plurality of tests is initiated for the entertainment applications installed on the portable communication device according to the network condition of the wireless mobile network. In yet another embodiment of the present disclosure, the plurality of tests is initiated for the entertainment applications installed on the portable communication device according to the network condition of the wired network with the finite bandwidth. In yet another embodiment of the present disclosure, the plurality of tests is initiated for the entertainment applications installed on the portable communication device according to the network condition of the optical fiber high bandwidth network.

In an embodiment of the present disclosure, the plurality of tests is initiated for the entertainment applications installed on the fixed communication device according to the network condition of the internet connection. In another embodiment of the present disclosure, the plurality of tests is initiated for the entertainment applications installed on the fixed communication device according to the network condition of the wireless mobile network. In yet another embodiment of the present disclosure, the plurality of tests is initiated for the entertainment applications installed on the fixed communication device according to the network condition of the wired network with the finite bandwidth. In yet another embodiment of the present disclosure, the plurality of tests is initiated for the entertainment applications installed on the fixed communication device according to the network condition of the optical fiber high bandwidth network.

In an embodiment of the present disclosure, the plurality of tests is initiated for the educational applications installed on the portable communication device according to the network condition of the internet connection. In another embodiment of the present disclosure, the plurality of tests is initiated for the educational applications installed on the portable communication device according to the network condition of the wireless mobile network. In yet another embodiment of the present disclosure, the plurality of tests is initiated for the educational applications installed on the portable communication device according to the network condition of the wired network with the finite bandwidth. In yet another embodiment of the present disclosure, the plurality of tests is initiated for the educational applications installed on the portable communication device according to the network condition of the optical fiber high bandwidth network.

In an embodiment of the present disclosure, the plurality of tests is initiated for the educational applications installed on the fixed communication device according to the network condition of the internet connection. In another embodiment of the present disclosure, the plurality of tests is initiated for the educational applications installed on the fixed communication device according to the network condition of the wireless mobile network. In yet another embodiment of the present disclosure, the plurality of tests is initiated for the educational applications installed on the fixed communication device according to the network condition of the wired network with the finite bandwidth. In yet another embodiment of the present disclosure, the plurality of tests is initiated for the educational applications installed on the fixed communication device according to the network condition of the optical fiber high bandwidth network.

In an embodiment of the present disclosure, the plurality of tests is initiated for the enterprise applications installed on the portable communication device according to the network condition of the internet connection. In another embodiment of the present disclosure, the plurality of tests is initiated for the enterprise applications installed on the portable communication device according to the network condition of the wireless mobile network. In yet another embodiment of the present disclosure, the plurality of tests is initiated for the enterprise applications installed on the portable communication device according to the network condition of the wired network with the finite bandwidth. In yet another embodiment of the present disclosure, the plurality of tests is initiated for the enterprise applications installed on the portable communication device according to the network condition of the optical fiber high bandwidth network.

In an embodiment of the present disclosure, the plurality of tests is initiated for the enterprise applications installed on the fixed communication device according to the network condition of the internet connection. In another embodiment of the present disclosure, the plurality of tests is initiated for the enterprise applications installed on the fixed communication device according to the network condition of the wireless mobile network. In yet another embodiment of the present disclosure, the plurality of tests is initiated for the enterprise applications installed on the fixed communication device according to the network condition of the wired network with the finite bandwidth. In yet another embodiment of the present disclosure, the plurality of tests is initiated for the enterprise applications installed on the fixed communication device according to the network condition of the optical fiber high bandwidth network.

The application quality testing system 110 receives an active testing data and a passive testing data associated with the one or more communication devices 104 under all of the network condition of the communication network 108. In addition, the active testing data corresponds to data associated with the one or more communication devices 104 under the plurality of tests in static conditions. Further, the passive testing data corresponds to data associated with the one or more communication devices 104 under the plurality of tests in mobility conditions. Furthermore, the application quality testing system 110 fetches real-time location of the one or more communication devices 104, and sound data from a microphone of the one or more communication devices 104. Moreover, the application quality testing system 110 fetches image data from a camera of the one or more communication devices 104, and accelerometer data from an accelerometer sensor of the one or more communication devices 104. Also, the application quality testing system 110 fetches gyroscope data from a gyroscope of the one or more communication devices 104, and sensor data from a sensor of the one or more communication devices 104. Also, the sensors include but may not be limited to a proximity sensor, a light sensor, a barometer, a magnetometer, a fingerprint sensor, an image sensor, and a touch sensor.

The application quality testing system 110 integrates the active testing data, the passive testing data, the real-time location, the sound data, the image data, the accelerometer data, the gyroscope data, and the sensor data. In addition, the integration is done to automate the plurality of tests, a device clean-up and maintenance of the one or more communication devices 104. In an embodiment of the present disclosure, the application quality testing system 110 measures the application experience of each of the plurality of users 102 in the static conditions. In another embodiment of the present disclosure, the application quality testing system 110 measures the application experience of each of the plurality of users 102 in the mobility conditions. The mobility conditions include but may not be limited to walking, driving, running, and commuting. Furthermore, the application quality testing system 110 is capable of conducting the plurality of tests on the one or more communication devices 104 in any of the network condition of the communication network 108.

The application quality testing system 110 analyzes the active testing data, the passive testing data, the real-time location, the sound data, the image data, the accelerometer data, the gyroscope data, and the sensor data. In addition, the application quality testing system 110 performs the analysis using one or more machine learning algorithms. Further, the analysis is performed based on training of a machine learning model. Furthermore, the analysis is performed in real time. In an embodiment of the present disclosure, the one or more machine learning algorithms include a decision tree algorithm and a random forest algorithm. In another embodiment of the present disclosure, the one or more machine learning algorithms include but may not be limited to prediction algorithms, deep learning algorithms, natural language processing algorithm and the like. However, the one or more machine learning algorithms are not limited to the above-mentioned algorithms.

The application quality testing system 110 creates the machine learning model to perform the prediction of the application experience and an application quality index. The machine learning model is trained to identify a plurality of key performance indicators. In an embodiment of the present disclosure, the machine learning model is trained using supervised machine learning model. In another embodiment of the present disclosure, the machine learning model is trained using un-supervised machine learning model. Moreover, the machine learning model predicts behavior of each of the plurality of users 102 based on user journey.

The application quality testing system 110 evaluates the application experience of each of the one or more applications 106 of the one or more communication devices 104 using the one or more machine learning algorithms. In addition, the application quality testing system 110 evaluates the application experience of each of one or more applications 106 based on identification of the plurality of key performance indicators. Further, the application quality testing system 110 identifies the plurality of key performance indicators for each of the one or more applications 106. Furthermore, the plurality of key performance indicators includes a technical application data and an application business data. Moreover, the technical application data corresponds to data associated with performance of each of the one or more applications 106. Also, the application business data includes application churn rate and drop in engagement. Also, the technical application data is dependent on one or more features. Also, the one or more features incudes load speed, the one or more communication devices 104, the operating system, and crash reports. Also, the application business data depends on a plurality of aspects. Also, the plurality of aspects include but may not be limited to session length, average application visits, daily active users, application churn rate, retention rate, and revenue.

In an embodiment of the present disclosure, the application experience is evaluated for the documentation applications installed on the portable communication device according to the network condition of the internet connection. In another embodiment of the present disclosure, the application experience is evaluated for the documentation applications installed on the portable communication device according to the network condition of the wireless mobile network. In yet another embodiment of the present disclosure, the application experience is evaluated for the documentation applications installed on the portable communication device according to the network condition of the wired network with the finite bandwidth. In yet another embodiment of the present disclosure, the application experience is evaluated for the documentation applications installed on the portable communication device according to the network condition of the optical fiber high bandwidth network.

In an embodiment of the present disclosure, the application experience is evaluated for the documentation applications installed on the fixed communication device according to the network condition of the internet connection. In another embodiment of the present disclosure, the application experience is evaluated for the documentation applications installed on the fixed communication device according to the network condition of the wireless mobile network. In yet another embodiment of the present disclosure, the application experience is evaluated for the documentation applications installed on the fixed communication device according to the network condition of the wired network with the finite bandwidth. In yet another embodiment of the present disclosure, the application experience is evaluated for the documentation applications installed on the fixed communication device according to the network condition of the optical fiber high bandwidth network.

In an embodiment of the present disclosure, the application experience is evaluated for the data management applications installed on the portable communication device according to the network condition of the internet connection. In another embodiment of the present disclosure, the application experience is evaluated for the data management applications installed on the portable communication device according to the network condition of the wireless mobile network. In yet another embodiment of the present disclosure, the application experience is evaluated for the data management applications installed on the portable communication device according to the network condition of the wired network with the finite bandwidth. In yet another embodiment of the present disclosure, the application experience is evaluated for the data management applications installed on the portable communication device according to the network condition of the optical fiber high bandwidth network.

In an embodiment of the present disclosure, the application experience is evaluated for the data management applications installed on the fixed communication device according to the network condition of the internet connection. In another embodiment of the present disclosure, the application experience is evaluated for the data management applications installed on the fixed communication device according to the network condition of the wireless mobile network. In yet another embodiment of the present disclosure, the application experience is evaluated for the data management applications installed on the fixed communication device according to the network condition of the wired network with the finite bandwidth. In yet another embodiment of the present disclosure, the application experience is evaluated for the data management applications installed on the fixed communication device according to the network condition of the optical fiber high bandwidth network.

In an embodiment of the present disclosure, the application experience is evaluated for the financial applications installed on the portable communication device according to the network condition of the internet connection. In another embodiment of the present disclosure, the application experience is evaluated for the financial applications installed on the portable communication device according to the network condition of the wireless mobile network. In yet another embodiment of the present disclosure, the application experience is evaluated for the financial applications installed on the portable communication device according to the network condition of the wired network with the finite bandwidth. In yet another embodiment of the present disclosure, the application experience is evaluated for the financial applications installed on the portable communication device according to the network condition of the optical fiber high bandwidth network.

In an embodiment of the present disclosure, the application experience is evaluated for the financial applications installed on the fixed communication device according to the network condition of the internet connection. In another embodiment of the present disclosure, the application experience is evaluated for the financial applications installed on the fixed communication device according to the network condition of the wireless mobile network. In yet another embodiment of the present disclosure, the application experience is evaluated for the financial applications installed on the fixed communication device according to the network condition of the wired network with the finite bandwidth. In yet another embodiment of the present disclosure, the application experience is evaluated for the financial applications installed on the fixed communication device according to the network condition of the optical fiber high bandwidth network.

In an embodiment of the present disclosure, the application experience is evaluated for the entertainment applications installed on the portable communication device according to the network condition of the internet connection. In another embodiment of the present disclosure, the application experience is evaluated for the entertainment applications installed on the portable communication device according to the network condition of the wireless mobile network. In yet another embodiment of the present disclosure, the application experience is evaluated for the entertainment applications installed on the portable communication device according to the network condition of the wired network with the finite bandwidth. In yet another embodiment of the present disclosure, the application experience is evaluated for the entertainment applications installed on the portable communication device according to the network condition of the optical fiber high bandwidth network.

In an embodiment of the present disclosure, the application experience is evaluated for the entertainment applications installed on the fixed communication device according to the network condition of the internet connection. In another embodiment of the present disclosure, the application experience is evaluated for the entertainment applications installed on the fixed communication device according to the network condition of the wireless mobile network. In yet another embodiment of the present disclosure, the application experience is evaluated for the entertainment applications installed on the fixed communication device according to the network condition of the wired network with the finite bandwidth. In yet another embodiment of the present disclosure, the application experience is evaluated for the entertainment applications installed on the fixed communication device according to the network condition of the optical fiber high bandwidth network.

In an embodiment of the present disclosure, the application experience is evaluated for the educational applications installed on the portable communication device according to the network condition of the internet connection. In another embodiment of the present disclosure, the application experience is evaluated for the educational applications installed on the portable communication device according to the network condition of the wireless mobile network. In yet another embodiment of the present disclosure, the application experience is evaluated for the educational applications installed on the portable communication device according to the network condition of the wired network with the finite bandwidth. In yet another embodiment of the present disclosure, the application experience is evaluated for the educational applications installed on the portable communication device according to the network condition of the optical fiber high bandwidth network.

In an embodiment of the present disclosure, the application experience is evaluated for the educational applications installed on the fixed communication device according to the network condition of the internet connection. In another embodiment of the present disclosure, the application experience is evaluated for the educational applications installed on the fixed communication device according to the network condition of the wireless mobile network. In yet another embodiment of the present disclosure, the application experience is evaluated for the educational applications installed on the fixed communication device according to the network condition of the wired network with the finite bandwidth. In yet another embodiment of the present disclosure, the application experience is evaluated for the educational applications installed on the fixed communication device according to the network condition of the optical fiber high bandwidth network.

In an embodiment of the present disclosure, the application experience is evaluated for the enterprise applications installed on the portable communication device according to the network condition of the internet connection. In another embodiment of the present disclosure, the application experience is evaluated for the enterprise applications installed on the portable communication device according to the network condition of the wireless mobile network. In yet another embodiment of the present disclosure, the application experience is evaluated for the enterprise applications installed on the portable communication device according to the network condition of the wired network with the finite bandwidth. In yet another embodiment of the present disclosure, the application experience is evaluated for the enterprise applications installed on the portable communication device according to the network condition of the optical fiber high bandwidth network.

In an embodiment of the present disclosure, the application experience is evaluated for the enterprise applications installed on the fixed communication device according to the network condition of the internet connection. In another embodiment of the present disclosure, the application experience is evaluated for the enterprise applications installed on the fixed communication device according to the network condition of the wireless mobile network. In yet another embodiment of the present disclosure, the application experience is evaluated for the enterprise applications installed on the fixed communication device according to the network condition of the wired network with the finite bandwidth. In yet another embodiment of the present disclosure, the application experience is evaluated for the enterprise applications installed on the fixed communication device according to the network condition of the optical fiber high bandwidth network.

The application quality testing system 110 normalizes the plurality of key performance indicators to evaluate the application quality index for each of the one or more applications 106. In addition, the plurality of key performance indicators is normalized according to the network condition of the communication network 108 of corresponding user of the plurality of users 102 that impacts the application experience.

In an embodiment of the present disclosure, the plurality of key performance indicators is normalized for the documentation applications installed on the portable communication device according to the network condition of the internet connection. In another embodiment of the present disclosure, the plurality of key performance indicators is normalized for the documentation applications installed on the portable communication device according to the network condition of the wireless mobile network. In yet another embodiment of the present disclosure, the plurality of key performance indicators is normalized for the documentation applications installed on the portable communication device according to the network condition of the wired network with the finite bandwidth. In yet another embodiment of the present disclosure, the plurality of key performance indicators is normalized for the documentation applications installed on the portable communication device according to the network condition of the optical fiber high bandwidth network.

In an embodiment of the present disclosure, the plurality of key performance indicators is normalized for the documentation applications installed on the fixed communication device according to the network condition of the internet connection. In another embodiment of the present disclosure, the plurality of key performance indicators is normalized for the documentation applications installed on the fixed communication device according to the network condition of the wireless mobile network. In yet another embodiment of the present disclosure, the plurality of key performance indicators is normalized for the documentation applications installed on the fixed communication device according to the network condition of the wired network with the finite bandwidth. In yet another embodiment of the present disclosure, the plurality of key performance indicators is normalized for the documentation applications installed on the fixed communication device according to the network condition of the optical fiber high bandwidth network.

In an embodiment of the present disclosure, the plurality of key performance indicators is normalized for the data management applications installed on the portable communication device according to the network condition of the internet connection. In another embodiment of the present disclosure, the plurality of key performance indicators is normalized for the data management applications installed on the portable communication device according to the network condition of the wireless mobile network. In yet another embodiment of the present disclosure, the plurality of key performance indicators is normalized for the data management applications installed on the portable communication device according to the network condition of the wired network with the finite bandwidth. In yet another embodiment of the present disclosure, the plurality of key performance indicators is normalized for the data management applications installed on the portable communication device according to the network condition of the optical fiber high bandwidth network.

In an embodiment of the present disclosure, the plurality of key performance indicators is normalized for the data management applications installed on the fixed communication device according to the network condition of the internet connection. In another embodiment of the present disclosure, the plurality of key performance indicators is normalized for the data management applications installed on the fixed communication device according to the network condition of the wireless mobile network. In yet another embodiment of the present disclosure, the plurality of key performance indicators is normalized for the data management applications installed on the fixed communication device according to the network condition of the wired network with the finite bandwidth. In yet another embodiment of the present disclosure, the plurality of key performance indicators is normalized for the data management applications installed on the fixed communication device according to the network condition of the optical fiber high bandwidth network.

In an embodiment of the present disclosure, the plurality of key performance indicators is normalized for the financial applications installed on the portable communication device according to the network condition of the internet connection. In another embodiment of the present disclosure, the plurality of key performance indicators is normalized for the financial applications installed on the portable communication device according to the network condition of the wireless mobile network. In yet another embodiment of the present disclosure, the plurality of key performance indicators is normalized for the financial applications installed on the portable communication device according to the network condition of the wired network with the finite bandwidth. In yet another embodiment of the present disclosure, the plurality of key performance indicators is normalized for the financial applications installed on the portable communication device according to the network condition of the optical fiber high bandwidth network.

In an embodiment of the present disclosure, the plurality of key performance indicators is normalized for the financial applications installed on the fixed communication device according to the network condition of the internet connection. In another embodiment of the present disclosure, the plurality of key performance indicators is normalized for the financial applications installed on the fixed communication device according to the network condition of the wireless mobile network. In yet another embodiment of the present disclosure, the plurality of key performance indicators is normalized for the financial applications installed on the fixed communication device according to the network condition of the wired network with the finite bandwidth. In yet another embodiment of the present disclosure, the plurality of key performance indicators is normalized for the financial applications installed on the fixed communication device according to the network condition of the optical fiber high bandwidth network.

In an embodiment of the present disclosure, the plurality of key performance indicators is normalized for the entertainment applications installed on the portable communication device according to the network condition of the internet connection. In another embodiment of the present disclosure, the plurality of key performance indicators is normalized for the entertainment applications installed on the portable communication device according to the network condition of the wireless mobile network. In yet another embodiment of the present disclosure, the plurality of key performance indicators is normalized for the entertainment applications installed on the portable communication device according to the network condition of the wired network with the finite bandwidth. In yet another embodiment of the present disclosure, the plurality of key performance indicators is normalized for the entertainment applications installed on the portable communication device according to the network condition of the optical fiber high bandwidth network.

In an embodiment of the present disclosure, the plurality of key performance indicators is normalized for the entertainment applications installed on the fixed communication device according to the network condition of the internet connection. In another embodiment of the present disclosure, the plurality of key performance indicators is normalized for the entertainment applications installed on the fixed communication device according to the network condition of the wireless mobile network. In yet another embodiment of the present disclosure, the plurality of key performance indicators is normalized for the entertainment applications installed on the fixed communication device according to the network condition of the wired network with the finite bandwidth. In yet another embodiment of the present disclosure, the plurality of key performance indicators is normalized for the entertainment applications installed on the fixed communication device according to the network condition of the optical fiber high bandwidth network.

In an embodiment of the present disclosure, the plurality of key performance indicators is normalized for the educational applications installed on the portable communication device according to the network condition of the internet connection. In another embodiment of the present disclosure, the plurality of key performance indicators is normalized for the educational applications installed on the portable communication device according to the network condition of the wireless mobile network. In yet another embodiment of the present disclosure, the plurality of key performance indicators is normalized for the educational applications installed on the portable communication device according to the network condition of the wired network with the finite bandwidth. In yet another embodiment of the present disclosure, the plurality of key performance indicators is normalized for the educational applications installed on the portable communication device according to the network condition of the optical fiber high bandwidth network.

In an embodiment of the present disclosure, the plurality of key performance indicators is normalized for the educational applications installed on the fixed communication device according to the network condition of the internet connection. In another embodiment of the present disclosure, the plurality of key performance indicators is normalized for the educational applications installed on the fixed communication device according to the network condition of the wireless mobile network. In yet another embodiment of the present disclosure, the plurality of key performance indicators is normalized for the educational applications installed on the fixed communication device according to the network condition of the wired network with the finite bandwidth. In yet another embodiment of the present disclosure, the plurality of key performance indicators is normalized for the educational applications installed on the fixed communication device according to the network condition of the optical fiber high bandwidth network.

In an embodiment of the present disclosure, the plurality of key performance indicators is normalized for the enterprise applications installed on the portable communication device according to the network condition of the internet connection. In another embodiment of the present disclosure, the plurality of key performance indicators is normalized for the enterprise applications installed on the portable communication device according to the network condition of the wireless mobile network. In yet another embodiment of the present disclosure, the plurality of key performance indicators is normalized for the enterprise applications installed on the portable communication device according to the network condition of the wired network with the finite bandwidth. In yet another embodiment of the present disclosure, the plurality of key performance indicators is normalized for the enterprise applications installed on the portable communication device according to the network condition of the optical fiber high bandwidth network.

In an embodiment of the present disclosure, the plurality of key performance indicators is normalized for the enterprise applications installed on the fixed communication device according to the network condition of the internet connection. In another embodiment of the present disclosure, the plurality of key performance indicators is normalized for the enterprise applications installed on the fixed communication device according to the network condition of the wireless mobile network. In yet another embodiment of the present disclosure, the plurality of key performance indicators is normalized for the enterprise applications installed on the fixed communication device according to the network condition of the wired network with the finite bandwidth. In yet another embodiment of the present disclosure, the plurality of key performance indicators is normalized for the enterprise applications installed on the fixed communication device according to the network condition of the optical fiber high bandwidth network.

The application quality testing system 110 calculates the application quality index based on the analysis of the active testing data and the passive testing data using the one or more machine learning algorithms. In addition, the application quality testing system 110 detects a plurality of issues associated with the one or more communication devices 104 in real time. Further, the application quality testing system 110 performs the device clean-up and the maintenance for the one or more communication devices 104 on detection of the plurality of issues in real time. Furthermore, the plurality of issues includes but may not be limited to memory issues, storage issues, and heating issues.

The application quality testing system 110 measures the application experience of each of the one or more applications 106 on the one or more communication devices 104 using an integrated bot. In an embodiment of the present disclosure, the integrated bot is artificial intelligence enabled piece of software that is integrated with the application quality testing system 110. In addition, the integrated bot is designed for each of the plurality of users 102. In an embodiment of the present disclosure, the integrated bot is a video bot. In another embodiment of the present disclosure, the integrated bot is a chat bot. In yet another embodiment of the present disclosure, the integrated bot is a personalized virtual assistant. In yet another embodiment of the present disclosure, the integrated bot is any suitable conversational agent.

The integrated bot collects a range of user interface events that allows an analysis module 230 (as shown in FIG. 2) to calculate the plurality of key performance indicators across categories of the one or more applications 106. In addition, the application quality testing system 110 enables the plurality of developers of the one or more applications 106 to analyze the application experience. Further, the application experience depends on the plurality of factors. Furthermore, the plurality of factors includes the signal strength, the quality, the transmission power, the handover latency, the Inter Radio Access Technologies, and the downlink throughput. Moreover, the plurality of factors includes the uplink throughput, the latency, the packet loss, the jitter, the web latency of websites, the video latency from user end, and the like.

The application quality testing system 110 automates collection of data from the plurality of tests conducted on the one or more communication devices 104 to fine-tune and optimize the data to ensure accuracy of the application experience. In addition, the application quality testing system 110 automates the plurality of tests on the one or more communication devices 104. In an embodiment of the present disclosure, the plurality of tests is initiated or conducted by the integrated bot. In another embodiment of the present disclosure, the plurality of tests is initiated or conducted by the cloud controller 220. In yet another embodiment of the present disclosure, the plurality of tests is initiated or conducted by the administrator 116.

The application quality testing system 110 monitors the range of user interface events at less than 50 milliseconds intervals. In addition, the application quality testing system 110 prevents application crashes due to constant polling of the range of user interface events. Further, the application quality testing system 110 may automatically initiate the plurality of tests on the one or more communication devices 104 from the cloud controller 220. Furthermore, the application quality testing system 110 may automatically schedule the plurality of tests on the one or more communication devices 104 from the cloud controller 220. Moreover, the application quality testing system 110 may monitor critical application performance of the one or more applications 106 in remote locations without human supervision.

The application quality testing system 110 conducts the plurality of tests automatically with about zero overload on the server 112 while conducting the plurality of tests. In addition, the application quality testing system 110 ensures that the one or more communication devices 104 is not communicating with the server 112 or any backend services while conducting the plurality of tests. Further, the communication with the server 112 or any backend services while conducting the plurality of tests is disabled to measure true application experience and performance for full network bandwidth of the communication network 108. Furthermore, the plurality of tests runs automatically locally with the one or more communication devices 104.

The application quality testing system 110 performs the device clean-up and the maintenance of the one or more communication devices 104 when the plurality of issues occurs due to performing the plurality of tests continuously. In addition, the plurality of issues includes but may not be limited to the memory issues, the storage issues, and the heating issues. Further, the application quality testing system 110 automatically detects the plurality of issues when performing the plurality of tests in real time. In an embodiment of the present disclosure, the application quality testing system 110 puts the one or more communication devices 104 in maintenance mode after detecting the plurality of issues. In another embodiment of the present disclosure, the application quality testing system 110 restarts the one or more communication devices 104 after detecting the plurality of issues if necessary. In addition, the one or more communication devices 104 may join the server 112 after the restart. Further, the application quality testing system 110 may schedule the device clean-up and the maintenance of the one or more The application quality testing system 110 schedules the plurality of tests for the one or more communication devices 104 based on the analysis using the one or more machine learning algorithms. In addition, the application quality testing system 110 assigns a unique test run identity prior to executing the plurality of tests automatically on the one or more applications 106. Further, the unique test run identity is unique for each of the plurality of tests run on the one or more communication devices 104. Further, the application quality testing system 110 computes the network condition of the communication network 108 utilized by each corresponding user of the plurality of users 102 prevailing during the plurality of tests.

The functional architecture 200 includes the application quality testing system 110, the cloud controller 220, and the analysis module 230. In addition, the application quality testing system 110 includes a device controller 202. Further, the device controller 202 includes a device state updater 204, a bot controller 206, a network packet capture 210, a video and screen capture 212, and operating system and device log capture 214. Furthermore, the device controller 202 includes a network condition monitoring 216 and a device and test management 218. Moreover, the cloud controller 220 includes a device registry 222, a bot script registry 224, a scheduling manager 226, and a storage and KPI database 228.

The device controller 202 corresponds a software that each of the plurality of users 102 has installed in the one or more communication devices 104. In addition, the device controller 202 performs functions to control the one or more communication devices 104. Further, the device state updater 204 corresponds to module that updates internet protocol, ports and availability to the cloud controller 220. Furthermore, the device state updater 204 enables the cloud controller 220 to connect with the one or more communication devices 104 if network changes.

The bot controller 206 corresponds to module that stores the integrated bot on the one or more communication devices 104. In addition, the bot controller 206 executes the integrated bot based on one or more commands from the cloud controller 220 or the administrator 116. Further, the bot controller 206 assigns the unique test run identity prior to executing the plurality of tests automatically on the one or more applications 106. Furthermore, the unique test run identity is unique for any of the plurality of tests run on the one or more communication devices 104. Moreover, the bot controller 206 maps the unique test run identity to an order identity, a script identity, and a test application build identity. Also, the order identity, the script identity, and the test application build identity are synced with the cloud controller 220. Also, the bot controller 206 enables each of the plurality of users 102 to define user journey and user experience for each of the one or more applications 106 while conducting the plurality of tests. Also, each of the one or more applications 106 has the user journey and the user experience for each of the plurality of users 102.

The device controller 202 logs information through the network packet capture 210, the video and screen capture 212, the operating system and device log capture 214, the network condition monitoring 216 and the device and test management 218. In addition, the network packet capture 210 corresponds to module that captures network packets while conducting the plurality of tests on the one or more communication devices 104. Further, the network packet capture 210 is synced and integrated with the bot controller 206. Furthermore, the network packet capture 210 allows the bot controller 206 to determine start and stop for the network packet capture 210. Moreover, the network packet capture 210 works continuously for entire duration of the plurality of tests. Also, the network packet capture 210 captures headers of the network packets. Also, the headers include layer 3 to layer 7 of the network packets.

The video and screen capture 212 is integrated for the one or more applications 106 that stream video and/or audio. In addition, quality of the video and/or audio plays vital role in determination of the application experience and quality perception of each of the one or more applications 106. Further, the video and screen capture 212 records downstream video and audio as received by the one or more communication devices 104 while conducting the plurality of tests. Furthermore, the downstream video and audio is analyzed by the analysis module 230 in cloud to quantify perceptual quality. Moreover, the video and screen capture 212 is synced and integrated with the bot controller 206 to allow the bot controller 206 to determine start and stop for the video and screen capture 212. Also, the video and screen capture 212 works continuously for entire duration of the plurality of tests.

The operating system and device log capture 214 corresponds to module that allows logging of the range of user interface events and state of the one or more communication devices 104. In addition, the state of the one or more communication devices 104 include but may not be limited to battery state, random-access memory (RAM) usage, and central processing unit (CPU) usage. Further, the bot controller 206 detects and logs the range of user interface events in the operating system logs with 50 milliseconds accuracy. Furthermore, the analysis module 230 calculates the application experience, the user experience and device resource drain KPIs from the state and the operating system logs.

The network condition monitoring 216 corresponds to module that measures quality of the communication network 108 of corresponding user of the plurality of users 102 prevailing during the plurality of tests. In addition, the network condition monitoring 216 performs a plurality of checks before conducting the plurality of tests. Further, the plurality of checks include but may not be limited to active download speed, upload speed, and latency check. Furthermore, the network condition monitoring 216 may monitor radio conditions while the plurality of tests. Moreover, the radio conditions include reference signals received power (RSRP) and reference signal received quality (RSRQ). Also, the network condition monitoring 216 logs internet service provider and location information like latitude, longitude, and cell tower information.

The device and test management 218 allows the plurality of users 102 or the administrator 116 to initiate the plurality of tests locally from the one or more communication devices 104 through user interface option. In addition, the plurality of tests on the one or more communication devices 104 may be initiated by the cloud controller 220. However, those skilled in the art would appreciate that the one or more communication devices 104 are connected to more number of cloud controllers. Further, the device and test management 218 manages queue of requests received from the bot controller 206 to initiate the plurality of tests. Furthermore, the device and test management 218 prioritizes queue of requests received from the bot controller 206 to initiate the plurality of tests. Moreover, the device and test management 218 maintains a cooling period between the plurality of tests where the device and test management 218 performs device management functions. The device management functions include but may not be limited to file deletion, cache clearing and restart of the one or more communication devices 104. Also, the device and test management 218 co-ordinates with the device state updater 204 to logically connect the one or more communication devices 104 back to the cloud controller 220.

The cloud controller 220 corresponds to a remote server based application that connects and controls the cloud of the one or more communication devices 104 over open internet. In addition, the functional architecture 200 may to more number of cloud controllers. Further, the administrator 116 interacts with the cloud controller 220 through a web application. The device registry 222 logs device identity, the state, and connection details of each of the one or more communication devices 104 that has the device controller 202 installed. In addition, the device registry 222 Is synced with the device state updater 204 to enable the cloud controller 220 to always connect with the one or more devices over internet to initiate the plurality of tests.

The bot script registry 224 stores automation bot scripts. In addition, the bot script registry 224 checks compatibility of the integrated bot with the automation bot scripts. Further, the bot script registry 224 pushes script codes to the device controller 202 for execution on the one or more communication devices 104 on trigger from the scheduling manager 226 or the device and test management 218. Furthermore, the scheduling manager 226 enables the administrator 116 to create testing schedule on any of the one or more communication devices 104. Moreover, the scheduling manager 226 enables the administrator 116 to perform a plurality of functions. Also, the plurality of functions include but may not be limited to selecting communication devices from the one or more communication devices 104, selecting one or more bot scripts from the bot script registry 224, and scheduling the scripts on the one or more communication devices 104 in a particular sequence.

The storage and KPI database 228 ensures raw data in synced with the database 114 when the plurality of tests is completed. In addition, the storage and KPI database 228 triggers the device and test management 218 to free up memory from the one or more communication devices 104 once the raw data is available to be analyzed by the analysis module 230. Further, the storage and KPI database 228 syncs final values of the plurality of key performance indicators with the device controller 202.

The interactive computing environment 100 includes the server 112 and the database 114. The application quality testing system 110 is associated with the server 112. In general, server is a computer program or device that provides functionality for other programs or devices. The server 112 provides various functionalities, such as sharing data or resources among multiple clients, or performing computation for a client. However, those skilled in the art would appreciate that the application quality testing system 110 is connected to more number of servers. Furthermore, it may be noted that the server 112 includes the database 114. However, those skilled in the art would appreciate that more number of the servers include more numbers of database.

In an embodiment of the present disclosure, the application quality testing system 110 is located in the server 112. In another embodiment of the present disclosure, the application quality testing system 110 is connected with the server 112. In yet another embodiment of the present disclosure, the application quality testing system 110 is a part of the server 112. The server 112 handles each operation and task performed by the application quality testing system 110. The server 112 stores one or more instructions for performing the various operations of the application quality testing system 110. The server 112 is located remotely from the application quality testing system 110. The server 112 is associated with the administrator 116. In general, administrator manages the different components in system. The administrator 116 coordinates the activities of the components involved in the application quality testing system 110. The administrator 116 is any person or individual who monitors the working of the application quality testing system 110 and the server 112 in real-time. The administrator 116 monitors the working of the application quality testing system 110 and the server 112 through a communication device. The communication device includes the laptop, the desktop computer, the tablet, a personal digital assistant and the like.

The database 114 stores different sets of information associated with various components of the application quality testing system 110. In general, the database is used to hold general information and specialized data, such as characteristics user journey and user experience data of the plurality of users 102, the technical application data of the one or more applications 106, the application business data of the one or more applications 106 and the like. The database 114 stores the information of the one or more applications 106, the one or more communication devices 104, the plurality of users 102, the automation bot scripts and the like. The database 114 organizes the data using model such as relational models or hierarchical models. Further, the database 114 stores data provided by the administrator 116.

FIGS. 3A and 3B illustrate a flowchart 300 to conduct the application quality tests on the one or more communication devices 104, in accordance with various embodiments of the present disclosure. It may be noted that in order to explain the method steps of the flowchart 300, references will be made to the elements explained in FIG. 1. The flowchart 300 starts at step 302. At step 304, the application quality testing system 110 initiates the plurality of tests on the one or more communication devices 104 for measuring the application experience in real time. At step 306, the application quality testing system 110 receives the active testing data and the passive testing data associated with the one or more communication devices 104 in real time. At step 308, the application quality testing system 110 integrates the active testing data and the passive testing data associated with the one or more communication devices 104 in real time. At step 310, the application quality testing system 110 analyzes the active testing data and the passive testing data using the one or more machine learning algorithms. At step 312, the application quality testing system 110 evaluates the application experience of each of the one or more applications 106 of the one or more communication devices 104 using the one or more machine learning algorithms. At step 314, the application quality testing system 110 performs the device clean-up and the maintenance for the one or more communication devices 104 on detection of the plurality of issues in real time.

The flowchart 300 terminates at step 316. It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates the block diagram of a computing device 400, in accordance with various embodiments of the present disclosure. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. The distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and nonvolatile media, removable and non-removable media. By way of example, and not limitation, the computer-readable media may comprise computer readable storage media and communication media. The computer readable storage media includes volatile and nonvolatile, removable and non-removable media implemented in any method or technology for storage of information such as computer-readable instructions, data structures, program modules or other data.

The computer-readable storage media with memory 404 includes, but is not limited to, non-transitory computer readable media that stores program code and/or data for longer periods of time such as secondary or persistent long term storage, like RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The computer-readable storage media associated with the memory 404 and/or other computer-readable media described herein can be considered computer readable storage media for example, or a tangible storage device. The communication media typically embodies computer-readable instructions, data structures, program modules or other data in a modulated data signal such as a carrier wave or other transport mechanism and in such a includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The computing device 400 includes one or more processors that read data from various entities such as the memory 404 or I/O components 412. The one or more presentation components 308 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to explain the principles of the present technology best and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed:

1. A computer-implemented method for conducting application quality tests on communication devices, the computer-implemented method comprising:

initiating, at an application quality testing system with a processor, a plurality of tests on one or more communication devices for measuring an application experience in real time;

receiving, at the application quality testing system with the processor, an active testing data and a passive testing data associated with the one or more communication devices in real time;

integrating, at the application quality testing system with the processor, the active testing data and the passive testing data associated with the one or more communication devices in real time;

analyzing, at the application quality testing system with the processor, the active testing data and the passive testing data using one or more machine learning algorithms, wherein the analysis is performed based on training of a machine learning model, wherein the analysis is performed in real time;

evaluating, at the application quality testing system with the processor, the application experience of each of one or more applications of the one or more communication devices using the one or more machine learning algorithms; and performing, at the application quality testing system with the processor, a device clean-up and maintenance for the one or more communication devices on detection of a plurality of issues in real time.

2. The computer-implemented method as recited in claim 1, further comprising detecting, at the application quality testing system with the processor, the plurality of issues associated with the one or more communication devices in real time.

3. The computer-implemented method as recited in claim 1, wherein the one or more communication devices are present in a plurality of geographical locations with any of a network condition of a communication network, wherein the network condition of the communication network governs the application experience of each of the one or more applications, wherein the network condition of the communication network comprising poor, moderate, good, and excellent.

4. The computer-implemented method as recited in claim 1, further comprising identifying, at the application quality testing system with the processor, a plurality of key performance indicators for each of the one or more applications, wherein the plurality of key performance indicators comprising a technical application data and an application business data, wherein the technical application data corresponds to data associated with performance of each of the one or more applications, wherein the application business data comprising application churn rate and drop in engagement, wherein the technical application data is dependent on one or more features, wherein the one or more features comprising load speed, the one or more communication devices, operating system, and crash reports, wherein The application business data depends on a plurality of aspects, wherein the plurality of aspects comprising session length, average application visits, daily active users, application churn rate, retention rate, and revenue.

5. The computer-implemented method as recited in claim 1, further comprising calculating, at the application quality testing system with the processor, an application quality index based on the analysis of the active testing data and the passive testing data using the one or more machine learning algorithms.

6. The computer-implemented method as recited in claim 1, further comprising scheduling, at the application quality testing system with the processor, the plurality of tests for the one or more communication devices based on the analysis using the one or more machine learning algorithms.

7. The computer-implemented method as recited in claim 1, further comprising preventing, at the application quality testing system with the processor, application crashes of the one or more applications due to constant polling of a range of user interface events in real time.

8. The computer-implemented method as recited in claim 1, further comprising enabling, at the application quality testing system with the processor, a plurality of developers of the one or more applications to analyze the application experience, wherein the application experience depends on a plurality of factors, wherein the plurality of factors comprising signal strength, quality, transmission power, handover latency, Inter Radio Access Technologies, downlink throughput, uplink throughput, latency, packet loss, jitter, web latency of websites, and video latency from user end.

9. The computer-implemented method as recited in claim 1, further comprising assigning, at the application quality testing system with the processor, a unique test run identity prior to executing the plurality of tests automatically on the one or more applications, wherein the unique test run identity is unique for each of the plurality of tests run on the one or more communication devices.

10. The computer-implemented method as recited in claim 1, further comprising computing, at the application quality testing system with the processor, the network condition of the communication network of corresponding user of a plurality of users prevailing during the plurality of tests.

11. A computer system comprising:
one or more processors; and
a memory coupled to the one or more processors, the memory for storing instructions which, when executed by the one or more processors, cause the one or more processors to perform a method for conducting application quality tests on communication devices, the method comprising:
initiating, at an application quality testing system, a plurality of tests on one or more communication devices for measuring an application experience in real time;
receiving, at the application quality testing system, an active testing data and a passive testing data associated with the one or more communication devices in real time;
integrating, at the application quality testing system, the active testing data and the passive testing data associated with the one or more communication devices in real time;
analyzing, at the application quality testing system, the active testing data and the passive testing data using one or more machine learning algorithms, wherein the analysis is performed based on training of a machine learning model, wherein the analysis is performed in real time;
evaluating, at the application quality testing system, the application experience of each of one or more applications of the one or more communication devices using the one or more machine learning algorithms; and
performing, at the application quality testing system, a device clean-up and maintenance for the one or more communication devices on detection of a plurality of issues in real time.

12. The computer system as recited in claim 11, wherein the one or more communication devices are present in a plurality of geographical locations with any of a network condition of a communication network, wherein the network condition of the communication network governs the application experience of each of the one or more applications, wherein the network condition of the communication network comprising poor, moderate, good, and excellent.

13. The computer system as recited in claim 11, further comprising identifying, at the application quality testing system, a plurality of key performance indicators for each of the one or more applications, wherein the plurality of key performance indicators comprising a technical application data and an application business data, wherein the technical application data corresponds to data associated with performance of each of the one or more applications, wherein the application business data comprising application churn rate and drop in engagement, wherein the technical application data is dependent on one or more features, wherein the one or more features comprising load speed, the one or more communication devices, operating system, and crash reports, wherein The application business data depends on a plurality of aspects, wherein the plurality of aspects comprising session length, average application visits, daily active users, application churn rate, retention rate, and revenue.

14. The computer system as recited in claim 11, further comprising calculating, at the application quality testing system, an application quality index based on the analysis of the active testing data and the passive testing data using the one or more machine learning algorithms.

15. The computer system as recited in claim 11, further comprising scheduling, at the application quality testing system, the plurality of tests for the one or more communication devices based on the analysis using the one or more machine learning algorithms.

16. The computer system as recited in claim 11, further comprising preventing, at the application quality testing system, application crashes of the one or more applications due to constant polling of a range of user interface events in real time.

17. The computer system as recited in claim 11, further comprising enabling, at the application quality testing system, a plurality of developers of the one or more applications to analyze the application experience, wherein the application experience depends on a plurality of factors, wherein the plurality of factors comprising signal strength, quality, transmission power, handover latency, Inter Radio Access Technologies, downlink throughput, uplink throughput, latency, packet loss, jitter, web latency of websites, and video latency from user end.

18. The computer system as recited in claim 11, further comprising assigning, at the application quality testing system, a unique test run identity prior to executing the plurality of tests automatically on the one or more applications, wherein the unique test run identity is unique for each of the plurality of tests run on the one or more communication devices.

19. The computer system as recited in claim 11, further comprising computing, at the application quality testing system, the network condition of the communication network of corresponding user of a plurality of users prevailing during the plurality of tests.

20. A non-transitory computer-readable storage medium encoding computer executable instructions that, when executed by at least one processor, performs a method for conducting application quality tests on communication devices, the method comprising:

initiating, at a computing device, a plurality of tests on one or more communication devices for measuring an application experience in real time;

receiving, at the computing device, an active testing data and a passive testing data associated with the one or more communication devices in real time;

integrating, at the computing device, the active testing data and the passive testing data associated with the one or more communication devices in real time;

analyzing, at the computing device, the active testing data and the passive testing data using one or more machine learning algorithms, wherein the analysis is performed based on training of a machine learning model, wherein the analysis is performed in real time;

evaluating, at the computing device, the application experience of each of one or more applications of the one or more communication devices using the one or more machine learning algorithms; and performing, at the computing device, a device clean-up and maintenance for the one or more communication devices on detection of a plurality of issues in real time.

* * * * *